Nov. 1, 1927.

J. S. STOKES 1,647,481

BOX WRAPPING SYSTEM

Filed Sept. 30, 1926

INVENTOR.
John S. Stokes
BY
Cornelius D. Ehret
ATTORNEY.

Nov. 1, 1927.
J. S. STOKES
BOX WRAPPING SYSTEM
Filed Sept. 30, 1926
1,647,481
6 Sheets-Sheet 5
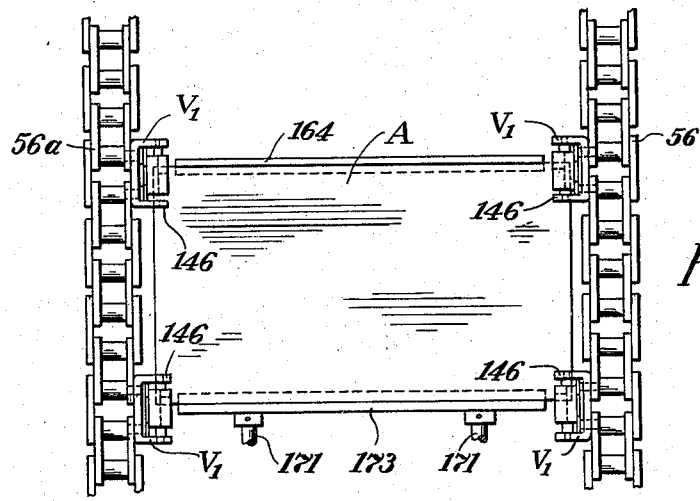
Fig. 6.
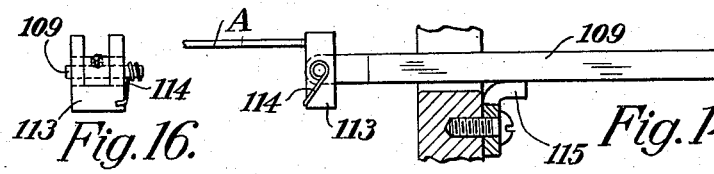 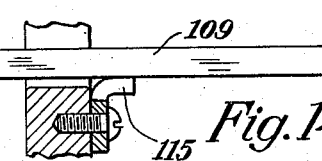 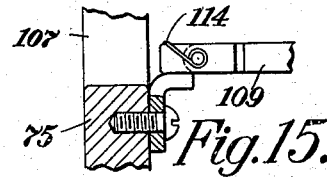
Fig. 16.  Fig. 14.  Fig. 15.
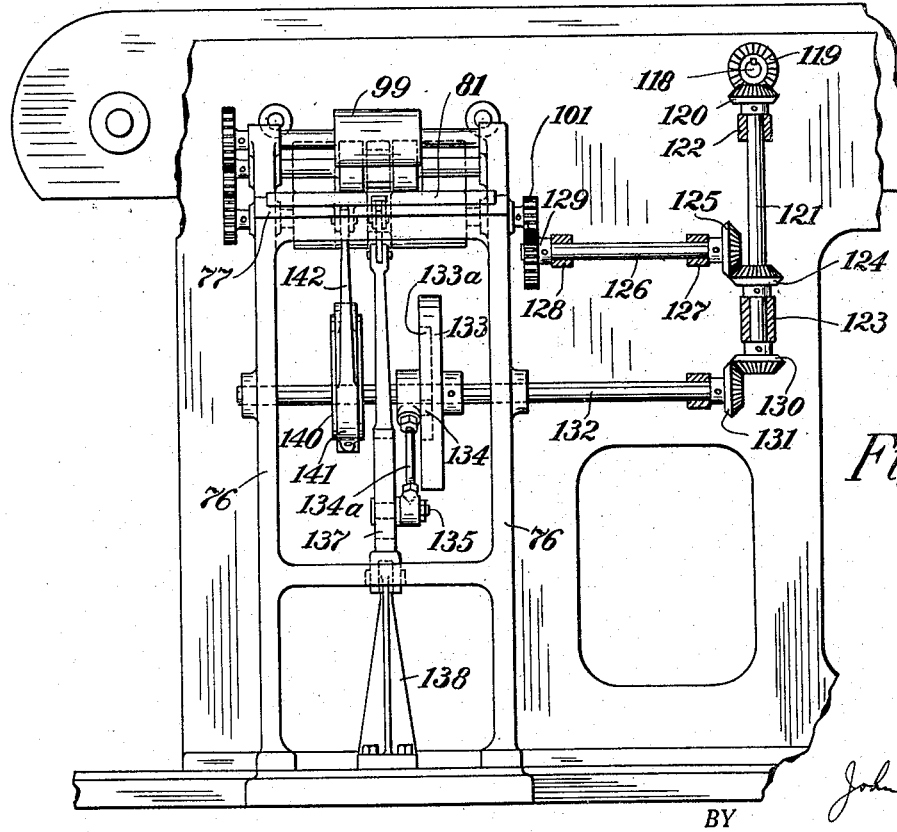
Fig. 5.
INVENTOR.
John S. Stokes
BY
Cornelius L. Ehret
ATTORNEY.

Nov. 1, 1927. 1,647,481
J. S. STOKES
BOX WRAPPING SYSTEM
Filed Sept. 30, 1926 6 Sheets-Sheet 6
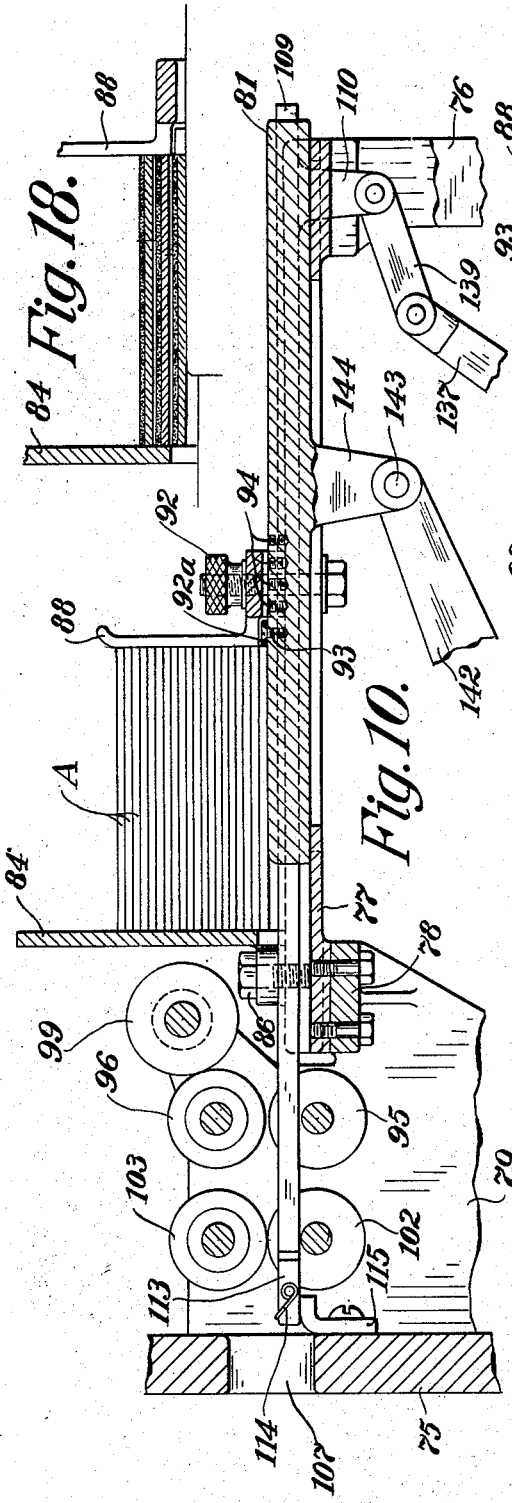
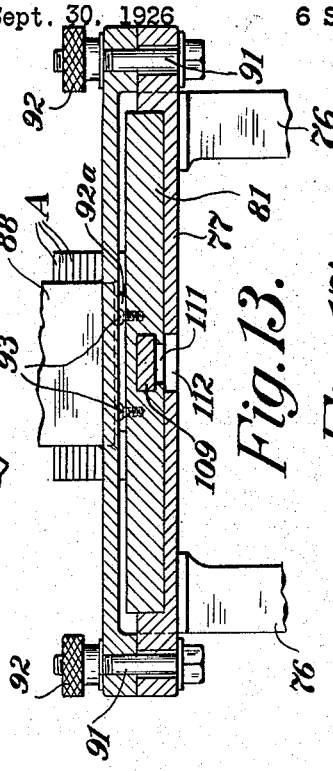
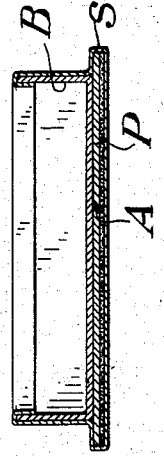
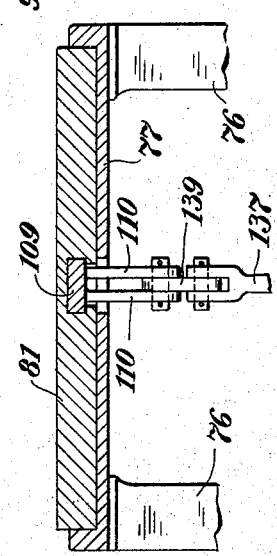
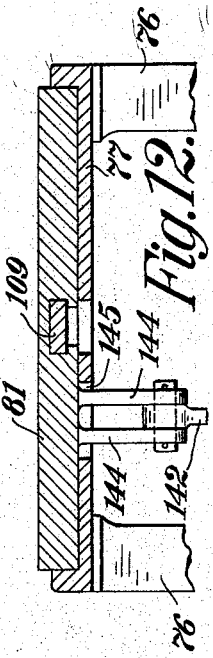
INVENTOR.
John S. Stokes
BY Cornelius L. Ebret
ATTORNEY.

Patented Nov. 1, 1927.

1,647,481

UNITED STATES PATENT OFFICE.

JOHN S. STOKES, OF HUNTINGDON VALLEY, PENNSYLVANIA, ASSIGNOR TO STOKES AND SMITH COMPANY, OF PHILADELPHIA, PENNSYLVANIA, A CORPORATION OF PENNSYLVANIA.

BOX-WRAPPING SYSTEM.

Application filed September 30, 1926. Serial No. 138,664. REISSUED

My invention relates to the art of applying a wrapper, sheet, label, or the like, either composite or non-composite, hereinafter generically termed a "wrapper", to a structure comprising a box, a box lid or cover, or the like, hereinafter generically termed a "box", and an extension bottom or extension top, hereinafter generically termed an "extension bottom".

In accordance with my invention, to a predetermined region, as, for example, the path of the form block structure of a wrapping machine, one each of the aforesaid components, to wit, a wrapper, box, and extension bottom, are simultaneously delivered, whereupon the wrapper is applied to the box and extension bottom.

Further in accordance with my invention, there is associated and timed with wrapper- and box-conveying mechanisms, delivering wrappers and boxes, respectively, individually and in succession into the path of the form block structure of a wrapping machine, a mechanism for transporting extension bottoms toward said path in succession, and, more particularly, said last-named mechanism delivers the extension bottoms to the wrapper-conveying mechanism by which they are delivered into said path.

Further in accordance with my invention, in suitable superposed relation there are delivered into the path of the form block structure of a wrapping machine a box, an extension bottom and an adhesive-coated wrapper, and, more particularly, the box overlies the extension bottom, and both overlie the wrapper.

Further in accordance with my invention, a member, as a pad of felt or the like, for producing an ornate appearance, of the completed box may be associated with one of the aforesaid components, as the extension bottom or the wrapper, preferably the latter, before arrival thereof at the wrapping station.

My invention resides in the method, apparatus and system of the character hereinafter described and claimed.

For an illustration of one of the various forms my invention may take, reference is to be had to the accompanying drawings, in which:

Fig. 5 is an elevational view, partly in section, of the structure shown in Fig. 3 as it appears when looking toward the conveying unit.

Fig. 6 is a fragmentary plan view illustrating a box-forming component supported by the conveying mechanism of the conveyor unit.

Fig. 7 is an elevational view, partly in section, showing a removable guide plate for the extension bottom.

Fig. 8 is an elevational view of the finger structure carried by a conveyor chain for supporting an extension bottom.

Fig. 9 is a transverse elevational view, partly in section, of the structure shown in Fig. 8.

Fig. 10 is a vertical sectional view, with parts in elevation, taken on the line 10—10 of Fig. 4.

Fig. 11 is a transverse vertical sectional view, with parts in elevation, taken on the line 11—11 of Fig. 4.

Fig. 12 is a transverse vertical sectional view, with parts in elevation, taken on the line 12—12 of Fig. 4.

Fig. 13 is a transverse vertical sectional view, with parts in elevation, taken on the line 13—13 of Fig. 4.

Fig. 14 is an elevational view, partly in section, showing a reciprocatory rod for transporting the extension bottom.

Fig. 15 is a view similar to Fig. 14, but showing another position of the reciprocatory rod.

Fig. 16 is an end elevational view of the structure shown in Fig. 14.

Fig. 17 is a vertical sectional view of a wrapped extension bottom box.

Fig. 18 is a vertical sectional view showing a stack of extension bottoms each having a felt pad or the like associated therewith.

Figure 1:
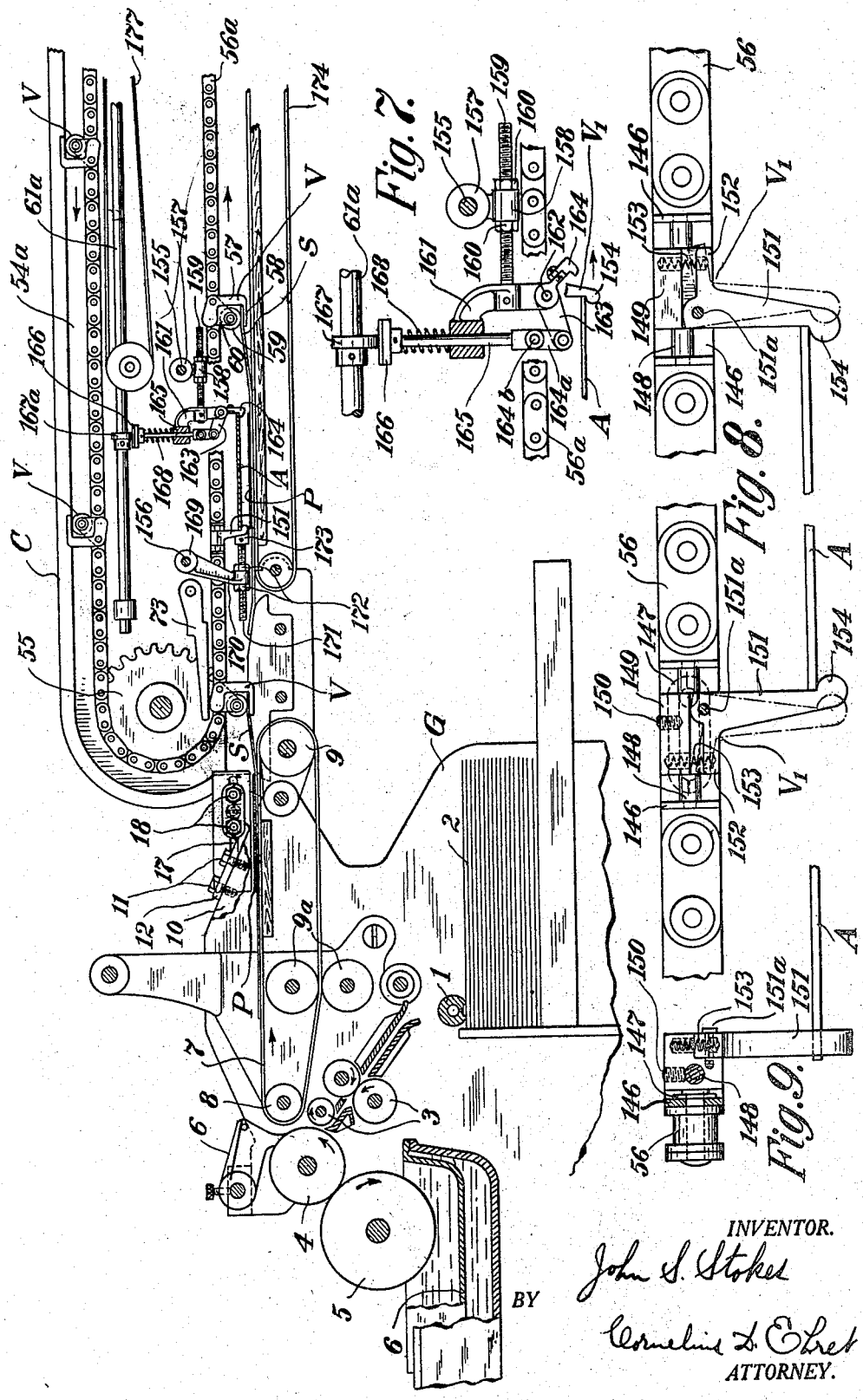
Fig. 1 is an elevational view, with parts in section, of an adhesive-applying unit and the delivery end of the conveying unit.
Figure 2:
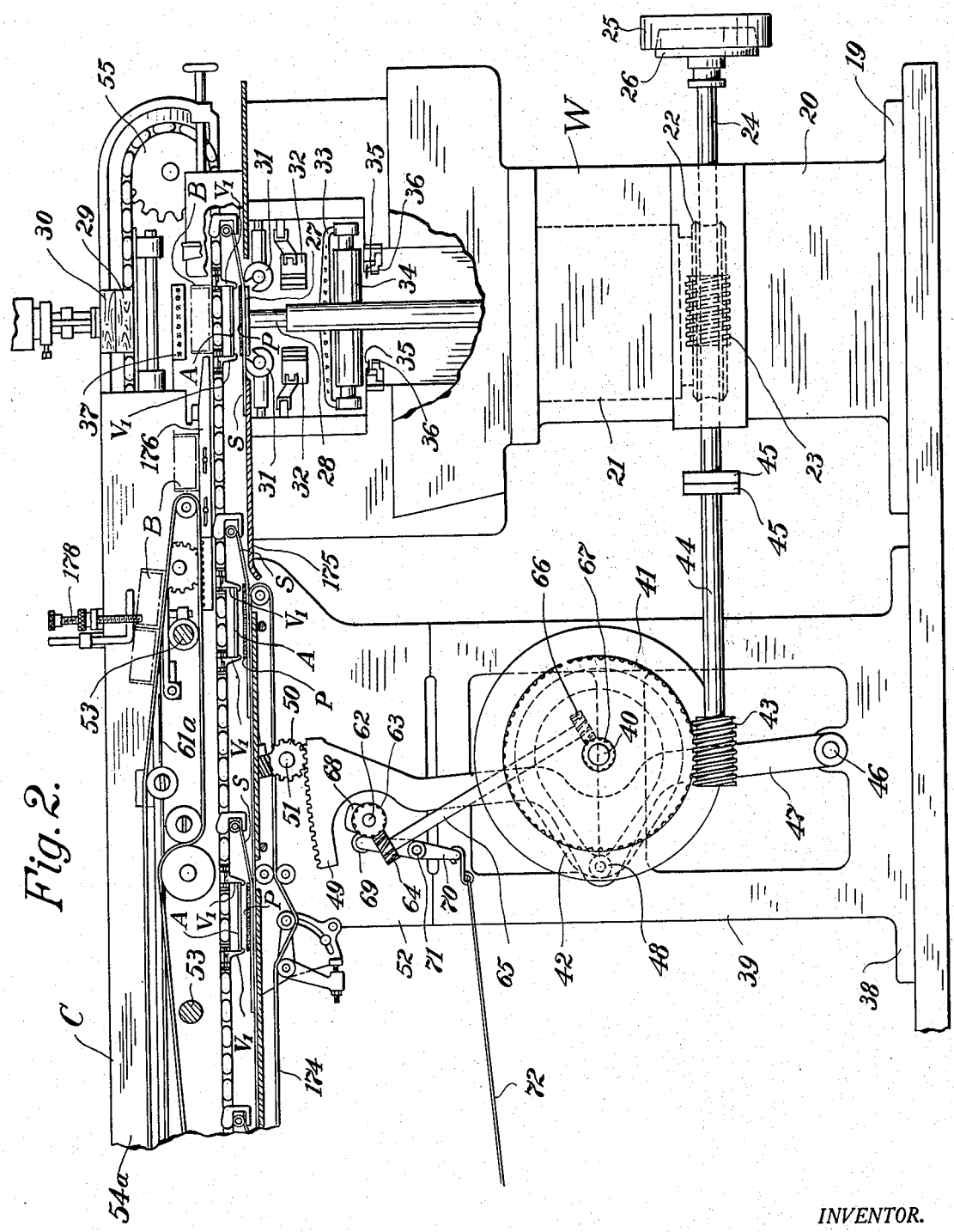
Fig. 2 is an elevational view, partly in section, of the delivery end of the conveying unit and the wrapping machine associated therewith.

Referring to Fig. 1, there is illustrated an adhesive-applying unit G and the receiving end of a conveying unit C, the delivery end of which is shown in Fig. 2 associated with a wrapping machine W or the like.

The adhesive-applying unit G may be of any suitable type capable of applying adhesive to wrappers of box-wrapping paper or other suitable material and delivering the coated wrappers in succession, preferably at uniform intervals. For example, the unit G may be of the same general type disclosed in Nitsch and Federwitz U. S. Letters Patent 1,472,614 granted October 30, 1923, or in Federwitz and Bailey application, Serial No. 40,769, filed July 1, 1925, or in the Nitsch and Weightman application, Serial No. 69,249, filed November 16, 1925.

The conveying unit C may be of the same general character disclosed in the aforesaid Federwitz and Bailey application, Serial No. 40,769, or in the Federwitz and Bailey application, Serial No. 70,462, filed November 21, 1925, modified, however, to care for the reception and transportation of the extension bottom, as hereinafter more particulary described.

The wrapping machine W may be of any suitable character, for example, as illustrated in the prior U. S. Letters Patent to Smith, No. 691,329, Nitsch & Federwitz, No. 1,540,900, or Federwitz & Bailey, Nos. 1,431,036 and 1,541,255 with the oppositely disposed rolls for folding the wrapper panels into engagement with the box walls suitably modified for extension bottom work, as well understood in the art.

In the example illustrated, the adhesive-applying unit G is of the same general type disclosed in the aforesaid Nitsch & Federwitz Patent No. 1,472,614. Unit G is driven at any suitable speed by any suitable source of power, and at predetermined intervals a suction roller 1 functions to deliver single wrappers S in succession from the stack 2 of unglued wrappers through the rotary feed roll mechanism designated generally at 3 into engagement with the glue-distributing roll 4 which engages the glue drum 5 so mounted as to rotate with its lower surface immersed in adhesive contained in the receptacle 6. As well understood in the art, the glue-distributing roll 4 by engaging the glue drum 5 has applied to its surface an adhesive coating which in turn is applied to individual wrappers as they are fed into engagement therewith through the rotary feed roll mechanism 3. The glue distributing roll 4 rotates in a counter clockwise direction, Fig. 1, and at predetermined intervals carries the advanced edge of a wrapper into engagement with the stripper members 6 which function to deflect the wrappers in succession toward the adhesive-applying unit belts 7, rotatable on the idler rolls 8 and 9, the upper span moving from left to right, Fig. 1, at predetermined intervals under control of the drive rolls 9ª of the adhesive-applying unit, as well understood in the art.

Figure 4:
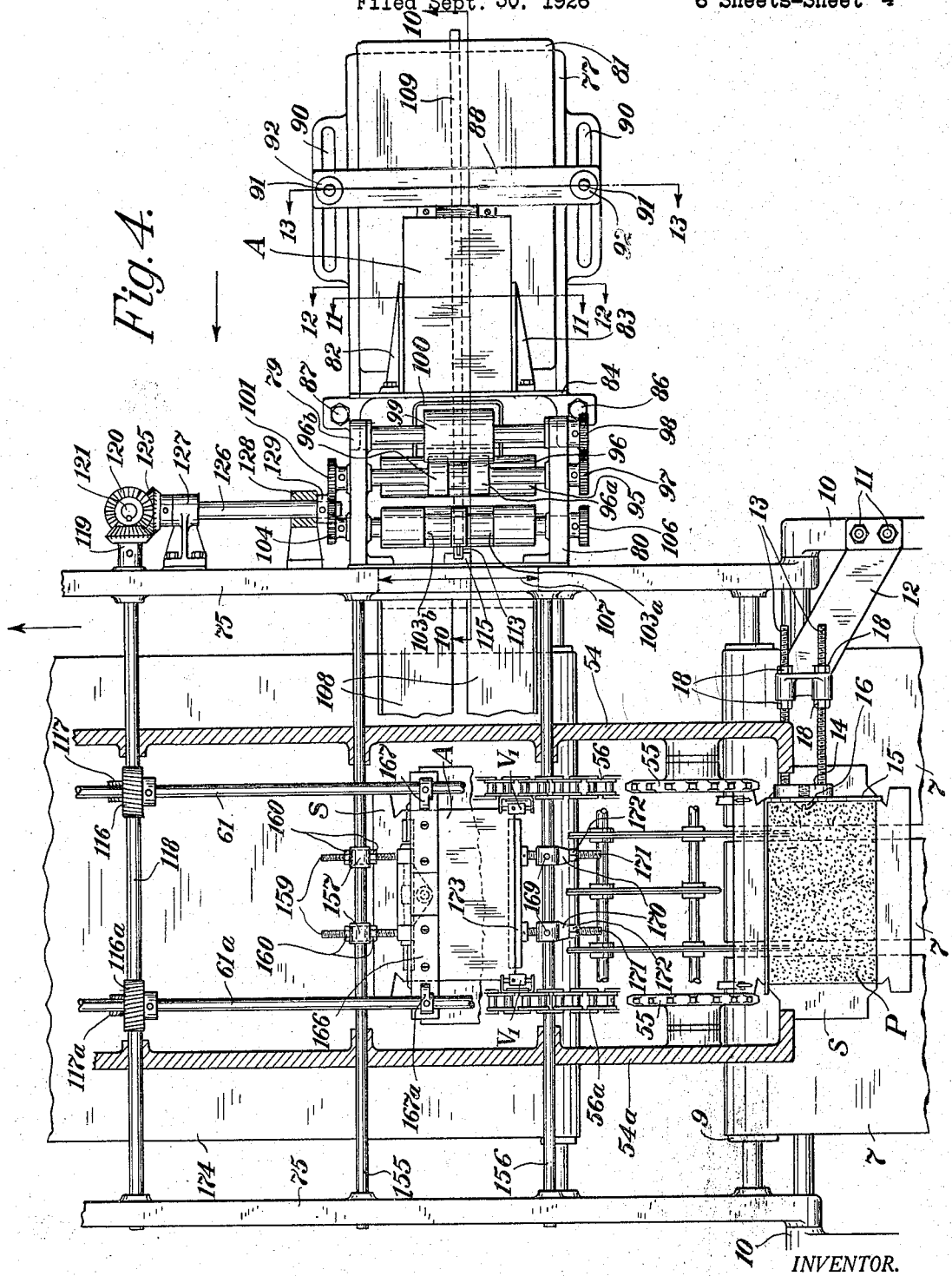
Fig. 4 is a plan view, partly in section, of the structure shown in Fig. 3.

Referring to Figs. 1 and 4, one of the frames 10 is shown as having secured thereto in any suitable manner, as by screws 11, a bracket 12 provided with passages receiving the screw threaded rods 13 carrying the member or plate 14 to which is secured the angular guide member 15. Preferably, plate 14 and member 15 are secured together by a screw 16 passing through a slot 17 formed in one leg of member 15, said screw 16 being threaded into plate 14. Disposed on the rods 13 on opposite sides of the aforesaid passages in bracket 12 are the nuts or binding elements 18 for holding the guide 15 in predetermined position above the belts 7.

In accordance with one form of my invention, an attendant utilizes the guide member 15 for positioning a felt pad P or the like on the upturned coated surfaces of individual wrappers as they momentarily pause in their journey toward the wrapping machine. By loosening screw 16 and nuts 18 the position of guide member 15 may be varied as desired, such adjustment usually being necessary upon change in the type or dimensions of wrappers passing through the unit G or in the type or dimensions of pads to be associated therewith.

The wrapping machine W comprises a base 19, upon which is disposed a frame or housing 20, in the lower portion of which is mounted a cam 21 having associated therewith the gear 22 driven by a worm 23 keyed to a shaft 24 driven by any suitable source of power, not shown, but preferably through the pulley 25, with which co-acts the clutch element 26 splined to shaft 24. As well understood in the art, the lower form block or platen 27 carried by the reciprocatory rod or member 28 moves downwardly under the influence of the intermediate and upper form blocks 29 and 30 as the latter is moved in the same direction by cam 21, said cam also controlling the various wrapper-applying instrumentalities for tools, herein shown in Fig. 2 as comprising the rollers 31 for forcing the wrapper side panels into intimate contact with the respective box sides, the corner lap turn-in members 32, the brush and roll structure 33 and 34 for folding the wrapper end panels into intimate contact with the respective box ends, the turn-in fingers 35 and the presser bars 36. Also, as clearly disclosed in the aforesaid Federwitz and Bailey application Serial No. 40,769, there may be provided brush structure 37 pivotally mounted adjacent opposite sides of the path of movement of the form block structure for stripping a wrapped box from the upper and intermediate form block structure upon rise thereof under the influence of cam 21.

The conveyor unit C comprises a base 38 supporting the sheet and box-conveyor mechanism and associated structure. Rising from base 38 is a pair of spaced standards or columns 39, in which is journaled a shaft 40 carrying a worm gear 41 and a cam 42. Worm gear 41 meshes with and is driven by a worm 43 carried by a shaft 44, which is secured to the shaft 24 in any suitable manner, as by plates 45 carried, respectively, by the ends of said shafts and bolted or otherwise secured to each other. Pivoted at 46 to the base 38 is a lever or arm 47, to which substantially midway of its ends is secured the laterally extending roller or cam follower 48 received in the cam track of cam 42. At its end removed from pivot 46, lever 47 terminates in the segment or gear quadrant 49 meshing with a gear 50 keyed to a shaft 51.

As clearly described in the aforesaid Federwitz and Bailey application Serial No. 40,769, the frame or housing structure comprising base 38 and standards 39 supports a pair of side frames 52 tied together by the transverse rods or members 53, upon which are slidably mounted the conveyor frames 54 and 54$^a$. For transversely adjusting the conveyor frames 54 and 54$^a$ along the tie members 53, there may be utilized mechanism of the character described in the aforesaid Federwitz and Bailey application, Serial No. 40,769 for simultaneously effecting equal adjustments of each conveyor frame toward and from an imaginary line disposed midway between the side frames 52 and extending longitudinally thereof.

Each conveyor frame 54 and 54$^a$ at its end adjacent the adhesive-applying unit G supports a laterally extending stub shaft upon which a sprocket wheel 55 is rotatably disposed. Similarly, adjacent the wrapping machine W, each conveyor frame also supports a sprocket wheel. Passing over the respective pairs of wheels thus mounted on the conveyor frames 54 and 54$^a$ are the bolts, bands, chains or the like 56 and 56$^a$.

Spaced equidistantly along chains 56 and 56$^a$ and aligned transversely thereof are the pairs of wrapper-gripping units V, each unit preferably being of the type disclosed in said Federwitz and Bailey application, Serial No. 40,769, and, therefore, comprising a movable actuating arm 57 terminating in a palm 58, which, for gripping a wrapper, co-acts with an edged disk or wheel 59 rotatably mounted on a stud secured to bracket 60 carried by a chain link pin.

Step-by-step movement timed with the wrapping machine of the lower spans of chains 56 and 56$^a$ toward, and the upper spans of said chains from, the wrapping machine may be effected in any suitable manner, as, for example, in my co-pending application, Serial No. 147,405 filed November 10, 1926. Or said chains may be intermittently moved in the manner disclosed in the aforesaid Federwitz and Bailey application, Serial No. 40,769, by mechanism operated by the shaft 51, Fig. 2.

Extending substantially parallel with and disposed in suitable bearings on the respective conveyor frames 54 and 54$^a$ are the "one-time" shafts 61 and 61$^a$, Figs. 1, 2, 3 and 4, corresponding with the shafts 51 of the aforesaid Federwitz and Bailey application, Serial No. 40,769. Rotation of shafts 61 and 61$^a$ once, and only once, for each cycle of operation of the wrapping machine may be effected in any suitable manner, as, for example, by mechanism operated by shaft 62 to which is secured the gear 63 meshing with and driven by a gear 64 keyed to one end of a suitably journaled shaft 65, to whose other end is keyed a gear 66 meshing with and driven by a gear 67 keyed to shaft 40, all as described and illustrated in the aforesaid Federwitz and Bailey application, Serial No. 40,769.

Shaft 62, which rotates once and only once for each cycle of operation of the wrapping machine W, has secured thereto a cam 68 which co-acts with a roller 69 on one end of a lever 70 pivoted on pin 71 mounted in frame 52, said lever 70 at its other end being secured to a rod, link or the like 72 extending to a lever, not shown, controlling operation of the glue unit G. Once during each rotation of shaft 62, cam 68 rocks the lever 70 to trip the glue unit G and cause a cycle of operation thereof. It shall be understood that cam 68 is so positioned on shaft 62 that the unit G will be successively actuated at the proper times to successively effect delivery of individual glued wrappers by the intermittently movable conveyor belts 7 to successive pairs of wrapping-gripping units V on the conveyor chains 56 and 56$^a$, said successive pairs of wrapper-gripping units pausing momentarily in wrapper-receiving position, as indicated in Fig. 1, where their actuating arms 57 are engaged by the members 73 upon operation thereof by cams secured respectively to the one-time shafts 61 and 61$^a$.

In accordance with my invention, the extension bottoms are individually fed from a stack thereof, suitably coated with adhesive, and then transported to structure associated with the chains 56 and 56$^a$ so that each extension bottom is retained in the desired registering relation with respect to the individual glued wrappers supported by said chains for movement toward the wrapping machine W.

Figure 3:
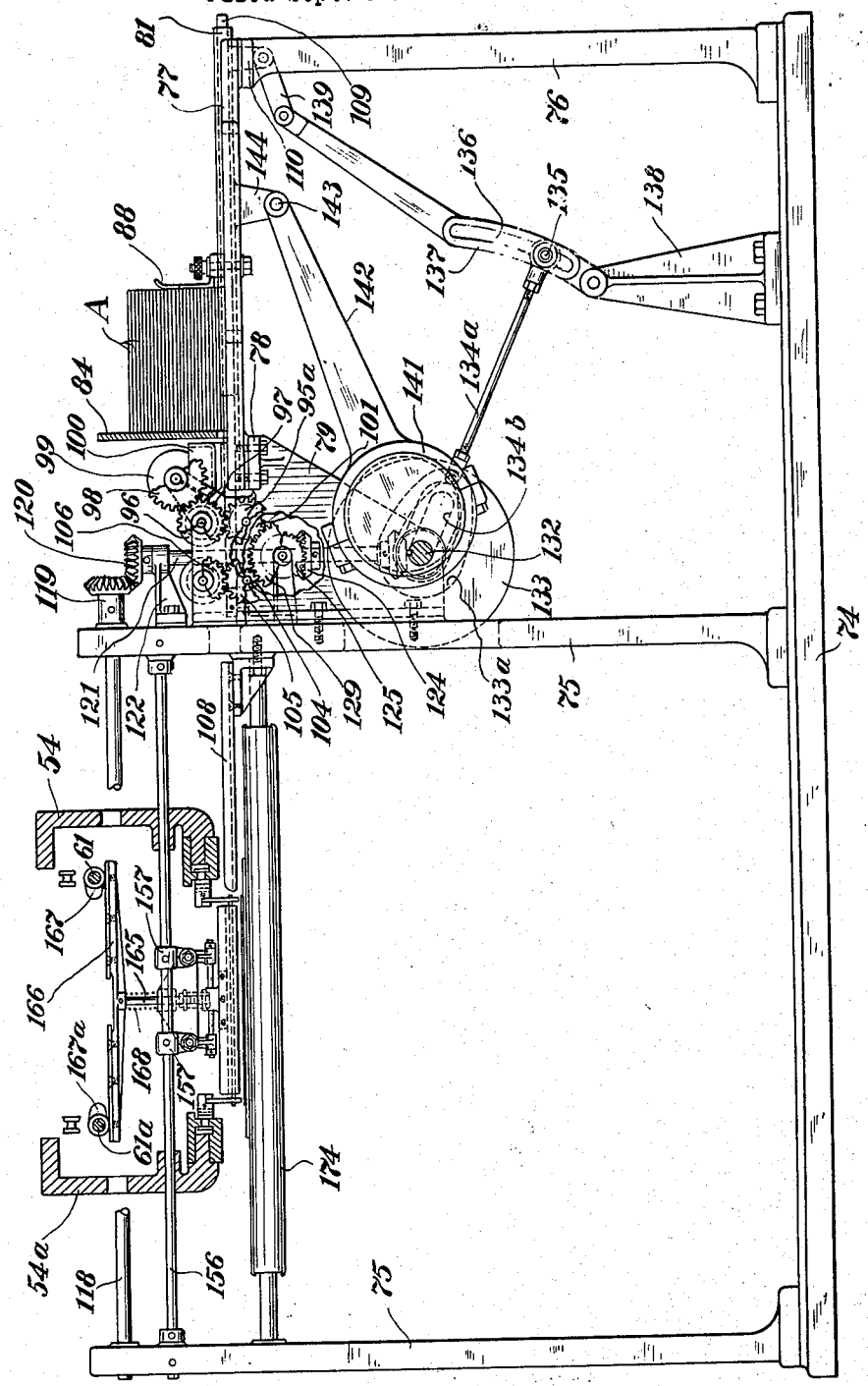
Fig. 3 is a transverse elevational view, partly in section, illustrating mechanism for removing individual extension bottoms from a stack thereof, applying an adhesive coating thereto, and delivering the same to the conveying unit.

To this end, there may be provided a suitable base 74, Fig. 3, from which rise the frames or standards 75 which, as indicated in Fig. 4, are preferably secured in suitable manner to the frames 10 of the adhesive-applying unit G. Secured to base 74 on one side of the conveyor unit C and one of the standards 75 are the standards or columns 76 forming a support for one end of a supporting member or table 77, whose other end, as indicated in Figs. 3 and 10, rests upon and is suitably secured to a ledge or shelf 78 forming a part of the spaced members 79 and 80 extending laterally of said last-named frame 75.

As indicated in Figs. 11, 12 and 13, table 77 forms a channel-shaped passage in which is slidably mounted a pusher member 81 upon whose upper surface is disposed a stack of individual extension bottoms A of cardboard, heavy paper or the like, said stack being disposed in a suitable hopper formed by the plates 82 and 83 extending laterally from an upright plate 84 secured to the table 77 at 86 and 87, Fig. 4. Abutting against the rear edge of the stack is the guide member 88 whose ends overlie slots 90 formed in side extensions of table 77. Screws, bolts or the like 91 pass through said slots and perforations in the end of member 88 and serve in conjunction with nuts 92 threaded to screws 91 to maintain said member in a desired adjusted position longitudinally of the table 77.

As pusher member 81 is moved toward the conveying unit C as hereinafter described, a member or bar 92$^a$ disposed transversely thereof and secured in a desired position thereon in any suitable manner, as by screws 93 passing therethrough and threaded into one of the groups of screw-threaded passages 94, Fig. 10, engages the lowermost element A in the stack and moves the same between the feed roll 95 and the glue-distributing roll 96, both of which are journaled in the members 79 and 80, Fig. 4. Exteriorly of member 80 the feed roll 95 has a gear 95$^a$, Fig. 3, meshing with a gear 97 on the glue-distributing roll 96, which gear 97 meshes with and drives a gear 98 secured to the glue drum 99, likewise journaled in the members 79 and 80. Glue drum 99 is disposed partly above and partly within a receptacle 100 containing suitable gumming or adhesive material, which is transferred first to the glue drum 99, and thence to the glue-distributing roll 96 by contact therewith, the latter roll serving to apply the adhesive or gumming material to the extension bottom passing therebeneath. Exteriorly of the member 79, the feed roll 95 has secured thereto a gear 101 actuated as hereinafter described.

Journaled in the members 79 and 80 immediately adjacent the frame member 75 are the so-called "high speed" feed rolls 102 and 103, the former, exteriorly of member 79, having a gear 104 secured thereto to be actuated as hereinafter described; exteriorly of member 80 roll 102 carries a gear 105, Fig. 3, meshing with and driving the gear 106 secured to the upper roll 103.

As indicated in Figs. 4 and 10, the frame 75 adjacent the structure described above is provided with a slot or passage 107, through which the individual extension bottoms are delivered onto the spaced guide plates 108.

Referring to Figs. 10 to 13, the reciprocatory pusher bar is illustrated as provided longitudinally thereof with a passage or channel receiving an elongated rod or member 109 having at one end thereof the spaced lugs or projections 110 slidable in aligned passages 111 and 112 disposed, respectively, in the pusher member 81 and table 77. Pivoted to the other end of rod 109 is the member 113, normally biased by a spring 114 or the like into a position at right angles to the rod 109, Fig. 4, but which, when rod 109 is retracted into the position indicated in Fig. 10, engages the bracket or angle 115 secured to frame 75 to swing the same against the tension of spring 114 into a position in longitudinal alignment with said member 109.

For driving the roll structure referred to above and for reciprocating the pusher bar 81 and rod 109, all in timed relation with the wrapping machine and the chains 56 and 56$^a$, the one-time shafts 61 and 61$^a$ are provided, respectively, with the gears 116 and 116$^a$, respectively meshing with and driving the gear 117 and 117$^a$ secured to a shaft 118 journaled in frame 75. Exteriorly of the frame 75 at the right, Fig. 4, shaft 118 has secured thereto the bevel gear 119 meshing with and driving a corresponding bevel gear 120 keyed to a shaft 121 having bearings at 122 and 123 on said last-mentioned frame member 75.

As illustrated in Fig. 5, there is keyed to shaft 121 a bevel gear 124 meshing with and driving a corresponding bevel gear 125 keyed to a shaft 126 having bearings on said last mentioned frame member 75 at 127 and 128. At its end removed from gear 125, shaft 126 has secured thereto the gear 129 meshing with and driving the gears 101 and 104, which, as stated above, are secured, respectively, to the rolls 95 and 102.

Likewise secured to the aforesaid shaft 121 is a bevel gear 130 meshing with and driving a corresponding bevel gear 131 secured to a shaft 132 extending through and journaled in the members 79 and 80. Keyed or pinned to the shaft 132 is a disk 133 having in one face the cam groove 133$^a$ receiving a cam follower 134 carried by a rod or link 134$^a$ having a slotted end portion 134$^b$ in which is received the shaft 132, Fig. 3. At its other end link 134$^a$ has a passage receiving a fastening bolt or member 135 passing through a slot 136 in a segment 137 pivoted at one end to the member 138 rising from base 74, and at its other end to a link 139 in turn pivoted to the aforesaid members 110, Fig. 11.

Secured to shaft 132 in spaced relation with respect to cam 133 is a second cam or eccentric 140, whose strap 141 terminates in a member 142 pivoted at 143 to the spaced members 144 depending from pusher bar 81 through the slot 145 in table 77, Fig. 12.

As illustrated in Figs. 6, 8 and 9 for supporting each extension bottom A in predetermined position with respect to or above the coated wrapper S carried by a pair of wrapper grippers V, the chains 56 and 56$^a$ between neighboring wrapper-gripper units V, have secured thereto pairs of transversely aligned spaced gripper units W forming a supporting structure into which individual extension bottoms are fed while chains 56 and 56$^a$ are at rest. As illustrated in Figs. 6, 8 and 9, each of said gripper units comprises a U-shaped member or bracket 146, secured to adjacent chain link pins by a spring clip 147. Carried by the laterally extending arms of bracket 146 is a rod 148 passing through a member 149, a set screw 150 or the like holding member 149 fixed to rod 148. Pivoted in an angular recess in member 149 is the finger 151 fulcrumed on pin 151$^a$, said finger 151 comprising a portion 152 engaged by a spring 153 seated in a recess in member 149. At its lower end, Fig. 8, finger 151 comprises a palm member 154 forming a support for the extension bottom.

Referring to Fig. 4, the standards 75 are shown as having the spaced bars or members 155 and 156 extending transversely thereof and secured thereto. Secured to member 155 is the pair of spaced collars 157, Fig. 7, from each of which depends a member 158 having a passage for a screw-threaded rod 159 maintained in a desired adjusted position by the binding nuts 160 co-acting with opposite ends of member 158. Secured to the rods 159 is a member 161, in whose lower portion is mounted a shaft 162 on which is disposed a bell crank lever 163 having at one end the guide plate 164. At its other end lever 163 has pivoted thereto the link 164$^a$ in turn pivoted at 164$^b$ to the end of a rod 165 mounted for sliding movement in the upper portion of member 161. Secured to the top of rod 165, Figs. 3 and 7, is a plate-like member 166, with which coact the cams 167 and 167$^a$ disposed, respectively, on the one-time shafts 61 and 61$^a$. Periodically, just prior to forward movement of chains 56 and 56$^a$, cams 167 and 167$^a$ depress the plate 166 and rod 165 against the spring 168 to swing the bell crank lever 163 and move the shelf 164 into the position indicated in Fig. 7.

Member 156 likewise has a pair of spaced collars 169 secured thereto, Fig. 4, from each of which likewise depends a member 170 having a passage for a screw-threaded rod 171 maintained in a desired adjusted position by nuts 172. Rods 171 support a plate 173 for guiding the cardboard element in its transverse movement with respect to the chains 56 and 56$^a$.

The operation is as follows:

Upon closure of clutch element 26 upon pulley 25, rotation of shafts 24 and 44 is initiated and the various moving parts of the entire mechanism are set in operation.

Cam 68 periodically oscillates lever 70 to move rod or link 72 to successively trip the glue unit G, which functions to deliver individual coated wrappers to the belts 7 by which they are carried in succession toward the receiving end of the conveyor unit C, where each is seized at its forward edge by a pair of open wrapper grippers V on chains 56 and 56$^a$, which immediately thereafter transport the same step-by-step toward the wrapping machine W.

During the period that the wrapper remains stationary as indicated at the left of Fig. 1, an attendant may utilize the guide member 15 to deposit a pad P of felt or the like in predetermined position on the coated surface of said wrapper, to which it adheres and is thereafter carried thereby toward the wrapping machine W.

As soon as a coated wrapper S has been positioned in a pair of waiting grippers V, as indicated at the left of Fig. 1, the lower spans of chains 56 and 56$^a$ start moving toward the wrapping machine W, and the palm members 58 swing on their pivots to hold the wrapper against the disks 59. Movement of said chains continues until the next pair of wrapper grippers V has been advanced into the position indicated at the left of Fig. 1, when, in the manner described in the aforesaid Federwitz and Bailey application, Serial No. 40,769, further movement of the chains is temporarily discontinued. Meanwhile, the first pair of gripper units V with the wrapper carried thereby has been advanced into the position indicated at the right of Fig. 1.

Upon initiation of operation of the combined mechanism, rotation of shaft 132, Fig. 5, was likewise initiated in response to rotation of one-time shafts 61 and 61$^a$, and, as determined by eccentric 140, table 81 starts its journey toward the left, Fig. 10, the member 92$^a$ on said table removing the lowermost extension bottom A from the stack and moving the same toward the left, Fig. 10, until its advanced edge passes between the rolls 95 and 96, whereupon the movement of table 81 is reversed and it returns to the position indicated in Fig. 10.

As clearly indicated in Fig. 4, the roll 96 comprises two spaced portions 96$^a$ and 96$^b$ to which adhesive is delivered by drum 99, said portions 96$^a$ and 96$^b$ functioning to apply two relatively narrow strips of adhesive to the upper surface of the extension bottom.

Rolls 95 and 96 move the extension bottom toward the left, Fig. 10, until its advanced edge passes between the high-speed rolls 102 and 103, the latter, as indicated in Fig. 4, being cut away at $103^a$ and $103^b$ to permit passage of the freshly applied adhesive strips without contacting with a roll surface.

Due to the relatively high rotative speed of rolls 102 and 103, the extension bottom is thrown or pushed at least part way through the slot 107 of frame 75, Fig. 10, and comes to rest in such position that it is supported either partly or entirely by guide plates 108. Immediately thereafter, cam 133 becomes effective to move rod 109 toward the left, Fig. 10, member 113, as soon as bracket 115 is cleared, assuming the angular position shown in Figs. 14 and 16. During movement of members 113 and 114 toward the left, Figs. 4 and 10, the extension bottom is pushed along the guide plates 108 onto the guide plates 164 and 173, by which said extension bottom is supported while moving into position above the wrapper S. When rod 109 reaches the limit of its stroke toward the left, Fig. 4, the extension bottom will be supported on opposite sides thereof by said guide members 163 and 173 and at each of its corners by the palm 154 of a finger 151. As soon as member 109 reaches the end of its stroke toward the left, Fig. 4, cam 133 becomes effective to immediately retract said rod.

As soon as the adhesive-coated extension bottom is positioned as described above, cams 167 and $167^a$ on the one-time shafts 61 and $61^a$ depress plate 166 against spring 168, and by the bell crank lever 163 guide plate 164 is swung into the position indicated in Fig. 7, out of the path of the extension bottom, the right hand edge of the extension bottom, Fig. 7, then being supported entirely by the palms 154 of the two forward fingers on chains 56 and $56^a$.

Immediately thereafter, the automatic mechanism of the conveyor unit C becomes effective to move chains 56 and $56^a$ another step toward the wrapping machine W. Upon initial movement of the chains as thus effected, the rear edge of the cardboard element A passes from the guide plate 173 and is supported entirely by the palms 154 of the two rear fingers 151.

The coated wrapper held by the gripper units V and the extension bottom positioned thereabove on the gripper units $V_1$ are now advanced toward the wrapping machine until an empty pair of wrapper-gripping units V is positioned adjacent the belt 7 and an empty pair of extension bottom gripper units $V_1$ with a coated wrapper disposed therebeneath is positioned in alignment with guide plates 108. In a manner as described above, a coated wrapper will be immediately supplied to the gripper units V and an adhesive-coated extension bottom to the gripper units $V_1$.

Thus, step by step, the chains 56 and $56^a$ of the conveyor unit C transport individual coated wrappers with individual coated extension bottoms positioned thereabove toward the wrapping machine W, and the supperposed structures in succession are moved into the position indicated at the right of Fig. 2.

Preferably, during passage of coated wrappers S toward the wrapping machine, they are supported by the movable belt structure 174, operated as described in the aforesaid Federwitz and Bailey application, Serial No. 40,769, and the fixed plate structure 175.

Coincidentally with the arrival of a coated wrapper S and an extension bottom A in the path of the wrapping machine form block structure, a box B is likewise delivered in said path by the box pusher bars 176, or equivalent reciprocating structure, operating in timed relation with the wrapping machine. Individual boxes are delivered by the continuously rotating box-conveying belts 177 to the top surfaces of the box pusher bars 176 under the control of the box release mechanism 178, likewise timed with the wrapping machine.

It shall be understood that the aforesaid box pusher bars 176 or the like, the flexible plate structure, when utilized, for holding a box B superposed above the extension bottom A, the box-conveying belts 177, and the box-releasing mechanism 178 may all operate as described in the aforesaid Federwitz and Bailey application, Serial No. 40,769.

After the box, the coated extension bottom and coated wrapper, either with or without a felt pad, are positioned in the path of wrapping machine form block structure as indicated in Fig. 2, the upper and intermediate form blocks 30 and 29 descend into the box B and carry the same into engagement with the upper coated surface of the extension bottom A. Due to the downward force thus effected, the fingers 155 of the extension bottom gripper units $V_1$ are swung on their pivots against the springs 153 into such position as indicated, for example, by the broken lines in Fig. 8. The extension bottom A with the box B now adhering to its upper surface is next moved into engagement either with the felt pad P or with the upper coated surface of wrapper S, whose forward edge has meanwhile been released, or is at this time released from the wrapper-gripper units V.

The various structures having thus been assembled between the lower form block 27 and intermediate form block 29, downward movement of the form block structure continues, carrying the coated wrapper S, extension bottom A and box B into co-active relation with the various wrapper-applying tools or instrumentalities of the wrapping machine to adhesively secure the wrapper panels to the box walls. Upon subsequent rise of the wrapping machine form block structure, the now wrapped extension bottom box may be stripped from the form block structure by the stripper bars 37.

The wrapped structure thus produced is indicated in Fig. 17, wherein the box B and extension bottom A have the wrapper S folded around their exterior surfaces, the wrapper also being folded interiorly of the box walls at the top thereof in a manner understood in the art. Likewise, as indicated in Fig. 17, the felt pad P lies between the extension bottom A and the adjacent wrapper portion.

As disclosed in the aforesaid Federwitz and Bailey application, Serial No. 40,769, adjustment longitudinally of the conveyor unit may be imparted to the wrapper-gripper-carrying chains; the conveyor frames carrying said chains and the box-feeding mechanism may be transversely adjusted, whereby wrappers and boxes of selected dimensions may be fed to the wrapping machine.

In order that an extension bottom of any selected size may be fed to the conveyor unit, it will be observed that the hopper shown in Figs. 4 and 10 receiving the extension bottoms may be adjusted to receive extension bottoms of a desired size by transversely shifting the plates 82 and 83 and by longitudinally shifting the member 88. For removing from the stack, extension bottoms of a selected size, the feeding bar 92ª may be positioned above a desired group of perforations 94 and secured in such region by the screws 93. Furthermore, the stroke of rod 109 may be changed by loosening the fastening bolt 135 and moving the rod 134 to a desired position in slot 136. Also by loosening nuts 160 and 172 the guide plates 163 and 173 may be adjusted longitudinally of the machine.

In accordance with my invention, felt pads P or the like may be supplied to the wrapping system otherwise than by an attendant through the guide member 15. For example, and as indicated in Fig. 18, individual felt pads or the like may be suitably secured to individual extension bottoms prior to the disposal of said bottoms in the hopper from which they are removed by the reciprocatory pusher bar 81.

It shall be understood that my invention comprehends the formation of wrapped extension bottom boxes wherein the various components are assembled in sequence different from that described above. Thus engagement may be first effected between the extension bottom and the wrapper or the pad adhering thereto, and thereafter engagement may be effected between the structure thus assembled and the box.

Under some circumstances, it may be desirable to utilize tabbed wrappers in performing the wrapping operation and, therefore, previously prepared tabbed wrappers may be stacked in the adhesive applying unit, or, as another example of such procedure, in lieu of the conveyor belt structure 7 herein disclosed, there may be substituted combined wrapper-conveying, wrapper-tabbing and tab-coating mechanism for delivering a coated tabbed wrapper to the receiving end of a conveying unit, all as clearly described in my co-pending application, Serial No. 97,198, filed March 25, 1926.

It shall be understood that unstayed boxes may be transported into the path of the wrapping machine form-block structure instead of the stayed boxes herein disclosed. As one example of this phase of my invention, the unstayed boxes may be shaped or formed as disclosed in Figs. 36–39 of the aforesaid Federwitz and Bailey application, Serial No. 40,769, and fed into the path of the wrapping machine from block structure by reciprocatory structure of the general character disclosed in said Federwitz and Bailey application.

Further, it shall be understood that in accordance with my invention boxes of any other suitable type may be fed into the path of the wrapping machine form block structure, for example, boxes formed of a plurality of separate box-forming components as disclosed in my co-pending application, Serial No. 88,231, filed February 15, 1926, and, preferably, as disclosed in my aforesaid application, Serial No. 147,505, filed November 10, 1926, the individual groups of box-forming components may be transported successively into the path of the wrapping machine form-block structure in timed relation with the delivery into said path of individual wrappers and individual extension bottoms.

What I claim is:

1. The method of forming an extension bottom box, which comprises, in steps immediately succeeding each other and in any sequence, effecting adhesive engagement between an extension bottom and a box, effecting engagement between the extension bottom and an adhesive coated wrapper, and applying sections of the coated wrapper to the box walls.

2. The method of forming an extension bottom box, which comprises, in steps immediately succeeding each other and in either sequence, effecting adhesive engagement between an extension bottom and a box and effecting engagement between the extension bottom and a section of an adhesive coated wrapper, and thereafter applying other sections of the coated wrapper to the box walls.

3. The method of forming an extension bottom box, which comprises, in steps immediately succeeding each other, effecting engagement between an extension bottom and a box, effecting engagement between the extension bottom and a section of an adhesive coated wrapper, and applying other sections of the coated wrapper to the box walls.

4. The method of forming an extension bottom box, which comprises, moving a box into engagement with an extension bottom, and immediately thereafter applying an adhesive coated wrapper to the extension bottom and to the box walls.

5. The method of forming an extension bottom box, which comprises adhesively securing an extension bottom to a box, and before setting of the adhesive adhesively securing a wrapper to the extension bottom and to the box walls.

6. The method of forming an extension bottom box, which comprises adhesively securing an extension bottom to a box, and before setting of the adhesive moving the extension bottom into engagement with the adhesive coated surface of a wrapper, and applying sections of the coated wrapper to the box walls.

7. The method of forming an extension bottom box, which comprises applying a pad to a wrapper, and applying said wrapper first to an extension bottom and then to the walls of a box.

8. The method of forming an extension bottom box, which comprises adhesively securing a pad to a wrapper, and applying the wrapper first to an extension bottom and then to the walls of a box.

9. The method of forming an extension bottom box, which comprises adhesively securing an extension bottom to a box, moving the extension bottom into engagement with a pad carried by an adhesive coated wrapper, and applying sections of the coated wrapper to the box walls.

10. The method of forming extension bottom boxes, which comprises in succession transporting wrappers, each carrying a pad and effecting engagement between a pad on a wrapper and an extension bottom.

11. The method of forming extension bottom boxes, which comprises transporting wrappers and detached extension bottoms in succession, and applying a wrapper to an extension bottom and a box.

12. The method of forming extension bottom boxes, which comprises transporting to a wrapping station in succession wrappers and detached extension bottoms, and at said station applying a wrapper to an extension bottom.

13. The method of forming extension bottom boxes, which comprises transporting to a wrapping station in succession coated wrappers, extension bottoms, and boxes, and at said station applying a wrapper to an extension bottom and a box.

14. The method of forming extension bottom boxes, which comprises transporting to a wrapping station in succession and in superposed relation coated wrappers, extension bottoms, and boxes, and at said station applying a wrapper to an extension bottom and a box.

15. The method of forming extension bottom boxes, which comprises transporting to a wrapping station in succession coated wrappers, coated extension bottoms, and boxes, at said station effecting adhesive engagement between a box and a coated extension bottom and applying a wrapper to the extension bottom and box.

16. The method of forming extension bottom boxes, which comprises transporting to a wrapping station in succession coated wrappers, extension bottoms, and wrappers, at said station moving a box into engagement with an extension bottom, thereafter moving the extension bottom into engagement with a coated wrapper, and applying the wrapper to the extension bottom and the box.

17. The method of forming extension bottom boxes, which comprises transporting in succession wrappers and pads, and applying a wrapper to an extension bottom and a box with the pad intervening between said extension bottom and wrapper.

18. The method of forming extension bottom boxes, which comprises transporting to a wrapping station in succession wrappers and pads, and at said station applying a wrapper to an extension bottom and a box with the pad intervening between said extension bottom and wrapper.

19. The method of forming extension bottom boxes, which comprises transporting in succession to a wrapping station wrappers, pads, and extension bottoms, and at said station applying a wrapper to an extension bottom and a box with the pad intervening between said extension bottom and wrapper.

20. The method of forming extension bottom boxes, which comprises transporting in succession to a wrapping station wrappers, pads, extension bottoms and boxes, and at said station applying a wrapper to an extension bottom and a box with the pad intervening between said extension bottom and wrapper.

21. The method of forming extension bottom boxes, which comprises transporting in succession to a wrapping station in superposed relation wrappers, pads, boxes, and extension bottoms, at said station moving a box into engagement with an extension bottom, and applying a wrapper to the extension bottom and box with the pad intervening between said extension bottom and wrapper.

22. The method of forming extension bottom boxes, which comprises transporting in succession to a wrapping station in superposed relation wrappers, pads, boxes and extension bottoms, at said station moving a a box into engagement with an extension bottom, moving the extension bottom into engagement with a pad, and applying a wrapper to the box walls.

23. The method of forming extension bottom boxes, which comprises transporting in succession to a wrapping station in superposed relation wrappers, each carrying a pad, boxes, and extension bottoms, at said station moving a box into engagement with an extension bottom, and applying a wrapper to the extension bottom and box with the pad intervening between the wrapper and extension bottom.

24. The method of forming extension bottom boxes, which comprises transporting wrappers in succession, depositing a pad on each wrapper, and applying a wrapper to an extension bottom and box with the pad intervening between said extension bottom and wrapper.

25. The method of forming extension bottom boxes, which comprises transporting coated wrappers in succession to a wrapping station, depositing a pad on the coated surface of each wrapper, and at said station applying a wrapper to an extension bottom and box with the pad intervening between said extension bottom and box.

26. The combination with a wrapping machine, of means timed therewith for delivering a series of extension bottoms and wrappers in successive groups, each comprising a bottom and a wrapper, into the path of the wrapping machine form-block structure.

27. The combination with a wrapping machine, of means timed therewith for delivering a series of extension bottoms, wrappers, and pads in successive groups, each comprising a bottom, wrapper and pad, into the path of the wrapping machine form-block structure.

28. The combination with a wrapping machine, of means timed therewith for delivering a series of extension bottoms and wrappers each carrying a pad in successive groups, each comprising a bottom and a wrapper carrying a pad, into the path of the wrapping machine form-block structure.

29. The combination with a wrapping machine, of means timed therewith for delivering a series of extension bottoms, wrappers, and boxes in successive groups each comprising a bottom, wrapper, and a box, into the path of the wrapping machine form-block structure.

30. The combination with a wrapping machine, of means timed therewith for delivering a series of extension bottoms, boxes, and wrappers, each carrying a pad in successive groups, each comprising an extension bottom, box, and wrapper carrying a pad, into the path of the wrapping machine form-block structure.

31. The combination with a wrapping machine, of coating mechanism, means timed with the wrapping machine for transporting extension bottoms in succession first into co-acting relation with said coating mechanism and then into the path of the wrapping machine form-block structure.

32. The combination with a wrapping machine, of coating mechanism, means comprising a reciprocatory member timed with the wrapping machine for transporting extension bottoms in succession first into co-acting relation with said coating mechanism and then into the path of the wrapping machine form-block structure.

33. The combination with a wrapping machine, of coating mechanism, means comprising an intermittently movable conveyor timed with the wrapping machine for transporting extension bottoms in succession first into co-acting relation with said coating mechanism and then into the path of the wrapping machine form-block structure.

34. The combination with a wrapping machine, of coating mechanism, means comprising a reciprocatory member and an intermittently movable conveyor both timed with the wrapping machine for transporting extension bottoms in succession first into co-acting relation with said coating mechanism and then into the path of the wrapping machine form-block structure.

35. The combination with a wrapping machine, of means timed therewith for delivering coated extension bottoms and coated wrappers in succession.

36. The combination with a wrapping machine, of means timed therewith for delivering coated extension bottoms and coated wrappers in succession, and means also timed with the wrapping machine for transporting boxes in succession.

37. The combination with a wrapping machine, of means timed therewith for delivering wrappers, extension bottoms, and boxes into the path of the wrapping machine form-block structure.

38. The combination with a wrapping machine, of means timed therewith for delivering along substantially parallel paths wrappers, extension bottoms, and boxes into the path of the wrapping machine form-block structure.

39. Apparatus for delivering a series of wrappers, a series of boxes, and a series of extension bottoms in succession, comprising a conveyor unit including means for intermittently delivering wrappers and extension bottoms to a predetermined region, and means for intermittently delivering boxes to said region.

40. Apparatus for delivering a series of wrappers, a series of boxes, and a series of extension bottoms in succession, comprising a conveyor unit including means for intermittently delivering wrappers and extension bottoms in superposed relation to a predetermined region, and means for intermittently delivering boxes to said region.

41. The combination with mechanism for delivering coated wrappers in succession, of means for depositing an individual pad on an individual wrapper.

42. The combination with mechanism for delivering coated wrappers in succession, of conveyor mechanism receiving the coated wrappers and transporting them to a predetermined region, and means for depositing an individual pad on an individual wrapper.

43. In combination, means for coating and delivering extension bottoms in succession, and a conveyor receiving the coated extension bottoms and transporting them to a predetermined region.

44. In combination, means for coating and delivering extension bottoms in succession, and a conveyor comprising groups of biased fingers receiving the coated extension bottoms and transporting them to a predetermined region.

45. In combination, means for coating extension bottoms in succession, a conveyor comprising extension bottoms supporting units, and means for delivering individual coated extension bottoms to individual units.

46. In combination, means for coating extension bottoms in succession, a conveyor comprising extension bottoms supporting units, and reciprocatory means for delivering individual coated extension bottoms to individual units.

47. In combination, means for coating extension bottoms in succession, a conveyor comprising extension bottoms supporting units, and reciprocatory means timed with said conveyor for delivering individual coated extension bottoms to individual units.

48. The combination with a wrapping machine, of a conveyor timed therewith and having a single direction of movement for transporting structurally different components of a wrapped box.

49. The combination with a wrapping machine, of a conveyor timed therewith and having a single direction of movement for transporting in superposed relation structurally different components of a wrapped box.

50. The combination with a wrapping machine, of a conveyor timed therewith for transporting detached extension bottoms and other components of extension bottom boxes.

51. The combination with a wrapping machine, of a conveyor timed therewith for transporting wrappers and extension bottoms for extension bottom boxes.

JOHN S. STOKES.